United States Patent
Crocker et al.

(10) Patent No.: US 7,218,925 B2
(45) Date of Patent: May 15, 2007

(54) METHOD OF INITIATING A TELEMATICS SERVICE

(75) Inventors: Dwayne A. Crocker, Oxford, MI (US); Mingheng Wang, Rochester Hills, MI (US); James J. Piwowarski, Holly, MI (US)

(73) Assignee: General Motors Corporation, Detroit, MI (US)

( * ) Notice: Subject to any disclaimer, the term of this patent is extended or adjusted under 35 U.S.C. 154(b) by 555 days.

(21) Appl. No.: 10/164,492

(22) Filed: Jun. 6, 2002

(65) Prior Publication Data

US 2004/0203672 A1    Oct. 14, 2004

(51) Int. Cl.
G01M 17/00 (2006.01)
G06F 17/00 (2006.01)
H04M 1/00 (2006.01)
H04M 3/00 (2006.01)

(52) U.S. Cl. ............... 455/419; 455/556.1; 455/575.9; 701/29; 701/49

(58) Field of Classification Search ............ 455/456.1; 701/33
See application file for complete search history.

(56) References Cited

U.S. PATENT DOCUMENTS

| | | | |
|---|---|---|---|
| 6,128,482 A * | 10/2000 | Nixon et al. ............ 455/414.1 |
| 6,148,212 A * | 11/2000 | Park et al. ............... 455/456.1 |
| 6,167,255 A * | 12/2000 | Kennedy et al. ......... 455/414.1 |
| 6,330,499 B1 | 12/2001 | Chou et al. |
| 6,405,033 B1 * | 6/2002 | Kennedy et al. ........ 455/414.1 |
| 6,434,223 B2 * | 8/2002 | Katz ....................... 379/93.13 |
| 6,535,743 B1 * | 3/2003 | Kennedy et al. ........ 455/456.1 |
| 6,604,033 B1 | 8/2003 | Banet et al. |
| 6,611,740 B2 | 8/2003 | Lowrey et al. |
| 6,687,587 B2 * | 2/2004 | Kacel ......................... 701/33 |
| 6,721,572 B1 * | 4/2004 | Smith et al. ............. 455/456.1 |
| 7,072,645 B2 * | 7/2006 | Schwinke et al. ......... 455/415 |
| 2002/0049535 A1 | 4/2002 | Rigo et al. |
| 2002/0068543 A1 * | 6/2002 | Shah ......................... 455/351 |
| 2002/0130769 A1 * | 9/2002 | Yamagishi ................. 340/426 |
| 2003/0040302 A1 * | 2/2003 | Okada ....................... 455/414 |
| 2003/0139173 A1 * | 7/2003 | Mazzara et al. ........... 455/418 |
| 2003/0193390 A1 | 10/2003 | Muramatsu |
| 2003/0214392 A1 | 11/2003 | Flick |
| 2004/0203634 A1 | 10/2004 | Wang et al. |
| 2004/0204806 A1 * | 10/2004 | Chen et al. .................. 701/36 |
| 2004/0242198 A1 | 12/2004 | Oyagi et al. |
| 2005/0085221 A1 | 4/2005 | Sumcad et al. |

* cited by examiner

*Primary Examiner*—Fan Tsang
*Assistant Examiner*—Lisa Hashem
(74) *Attorney, Agent, or Firm*—Anthony Luke Simon

(57) ABSTRACT

The invention provides a method of initiating a telematics service to a mobile vehicle. A service initiation is received from a call center. A caller identification number of the service initiation is determined. A vehicle service function is determined based on the caller identification number.

21 Claims, 2 Drawing Sheets

200

At Call Center

At Mobile Vehicle

METHOD OF INITIATING A TELEMATICS SERVICE

FIELD OF THE INVENTION

This invention relates generally to a method of operating a wireless communication system. More specifically, the invention relates to a method of initiating a telematics service in a mobile vehicle.

BACKGROUND OF THE INVENTION

In recent years, wireless communication services for automobiles and mobile phones have increased greatly in the variety and number, along with the concomitant demands on telematics service call centers. A call center needs to be able to process requests in a timely fashion and find more efficient and automatic ways to respond to a service request. The processing of a service request may require a large amount of dedicated resources including the time of human and virtual advisors, modem time, and additional software applications used by the advisors for processing requests. Examples of subscriber requests that may benefit from an increased level of automation are user requests for running electronic diagnostics, locating a vehicle, unlocking a car door, honking a horn, or flashing headlights.

However, even with the use of virtual advisors, resources may be overextended and as the requests to a call center increase, the call center may be unable to process all the service requests successfully or it may need longer time to finish the process. Customers may be put on hold and service may be delayed.

It would be beneficial to have an alternative approach to request common and potentially automatic services such as the unlocking of doors. Ideally, this mechanism would be as effective as and more efficient than the current processing of service requests. An improved service request method would allow the user to call from any dial-tone phone, increase the throughput of caller traffic, and save phone-connection time. It would also allow service requests to be processed in more than one manner. The method would avoid the need to queue or deny the request based on the availability of modem lines and advisors, simplify the service request process, and increase the quality of service of the call center.

It is an object of this invention, therefore, to provide a method for initiating a service request to a mobile vehicle, and to overcome the deficiencies and obstacles described above.

SUMMARY OF THE INVENTION

One aspect of the invention provides a method of initiating a telematics service to a mobile vehicle. A service initiation call may be received from a call center. A caller identification number of the service initiation call may be determined. A vehicle service function may be determined based on the caller identification number.

Another aspect of the invention provides a computer usable medium that includes a program for initiating a telematics service to a mobile vehicle. The program includes code to receive a service initiation call from a call center, code to determine a caller identification number of the service initiation call, and code to determine a vehicle service function based on the caller identification number.

Another aspect of the invention provides a system for initiating a telematics service to a mobile vehicle including means for receiving a service initiation call from a call center, means for determining a caller identification number of the service initiation call, and means for determining a vehicle service function based on the caller identification number.

The aforementioned, and other features and advantages of the invention will become further apparent from the following detailed description of the presently preferred embodiments, read in conjunction with the accompanying drawings. The detailed description and drawings are merely illustrative of the invention rather than limiting, the scope of the invention being defined by the appended claims and equivalents thereof.

DETAILED DESCRIPTION OF THE PRESENTLY PREFERRED EMBODIMENTS

Figure 1:
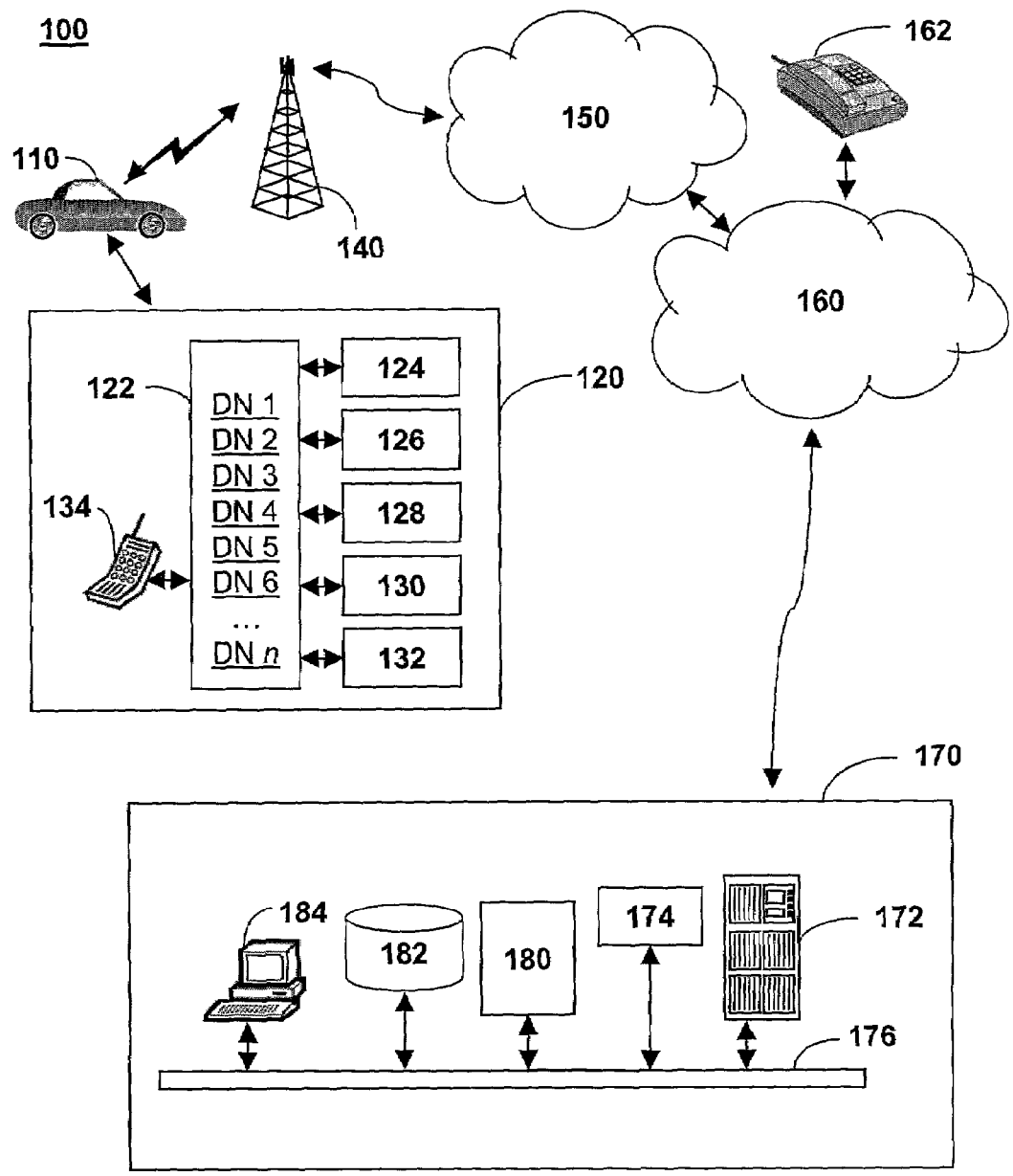
FIG. 1 is an illustration of one embodiment of a system for initiating a telematics service to a mobile vehicle, in accordance with the current invention.

FIG. 1 shows an illustration of one embodiment of a system for initiating a service to a mobile vehicle using caller identification technology, in accordance with the present invention at 100. Mobile vehicle service initiation system 100 provides a system that uses existing telecommunication infrastructures, caller identification technology, and call setup procedures between a mobile vehicle and telematics service call center as a way of triggering certain service events or functions within a mobile vehicle or portable telematics or telemetry units. Specific events such as door lock/unlock, invocation of diagnostic data transfer, and ignition disablement may be instigated by a telematics unit that is equipped with a caller identification application to perform a basic event in response to a call dialed from a specific phone number of a telematics service call center. When a telephone number is recorded by the caller identification application and it matches a number in a list of directory or phone numbers associated with designated functions or events, the telematics unit may command an event to occur in the vehicle without answering the call, independent whether or not an end-call or blocked-call message is sent back to the call center. The service event or function may be provided in an efficient and timely manner using a minimum of telecommunication and network resources.

Mobile vehicle service initiation system 100 may include a mobile vehicle 110, a telematics unit 120, one or more wireless carrier systems 140, one or more communication networks 150, one or more land networks 160, and one or more call centers 170.

Mobile vehicle 110 is a mobile vehicle equipped with suitable hardware and software for transmitting and receiving voice and data communications. Mobile vehicle 110 contains a telematics unit 120 that may include a vehicle communications processor. Telematics unit 120 includes a system controller 122 connected to a wireless modem 124, a global positioning system (GPS) unit 126, an in-vehicle memory 128, a microphone 130, one or more speakers 132, and an embedded in-vehicle mobile phone 134. GPS unit 126 provides longitude and latitude coordinates of the vehicle. In-vehicle mobile phone 134 may be an analog, digital, or multi-mode cellular phone. The system controller may also be referred to as a host processor, digital signal processor (DSP) or microcontroller.

System controller 122 may execute various computer programs that control programming and operational modes of various systems within mobile vehicle 110. A voice-recognition application may be installed in system controller 122 that translates human voice input through microphone 130 to digital signals. These signals may activate the programming mode and operation modes, as well as provide input data. Signals from system controller 122 may be translated into voice messages and sent out through speaker 132.

System controller 122 may control a software application operating on caller identification information from incoming calls. Also called caller line identification or automatic number identification (ANI), caller ID services are performed within signaling system 7 (SS7) and signaling connection control part (SCCP), current standards that allow a calling party number message (CPNM or CPN) and related call setup messaging to be sent. The CPNM includes the number of the caller that may be passed to the called party's exchange where the CPNM is translated into the local form of caller ID. The caller ID information may be transmitted on the subscriber loop telephone network using frequency shift keyed (FSK) modem tones or dual tone multi-frequency (DTMF), which may transmit the display message in American Standard Code for Information Interchange (ASCII) character code form. Caller ID may use the U.S. Bellcore standard that sends the identification information asynchronously between the first and second ring at a signal level of −13.5 dBm with the 1200 baud Bell 202 tone modulation. The information received from the wireline network (PSTN) may be encapsulated within a control channel message of the wireless carrier and transmitted to the in-vehicle mobile phone as part of the call establishment process. The sent information may include the date, time, calling number and sometimes the name associated with the calling number.

When in-vehicle mobile phone 134 receives a service initiation call, a caller ID application of system controller 122 may determine the caller identification number of the incoming call. The application may access a list or table of directory numbers from DN1 to DNn. The directory numbers in the list or table may be stored in in-vehicle memory 128. The application may then compare the received caller identification number to the list of call center directory numbers (DN1–DNn) with their corresponding and associated vehicle service functions. When the phone number corresponds to one of the numbers in the list of call-center phone numbers dedicated to a specific vehicle function, system controller 122 may direct in-vehicle mobile phone 134 to send an end-call or block-call message back to the call center without answering the call, and then perform the requested service that corresponds to and is represented by the calling party's phone number. Alternatively, system controller 122 need not answer the phone or send back an end-call message, but it may still perform the requested service. In many cases, a voice circuit may never be established.

Mobile vehicle 110 via telematics unit 120 sends and receives radio transmissions from wireless carrier system 140. Wireless carrier system 140 may be any suitable system for transmitting a signal from mobile vehicle 110 to communication network 150.

Communication network 150 may comprise services from one or more mobile telephone switching offices and wireless networks. Communication network 150 may connect wireless carrier system 140 to land network 160. Communication network 150 may be any suitable system or collection of systems for connecting wireless carrier system 140 to mobile vehicle 110 and land network 160.

Land network 160 may be a public-switched telephone network (PSTN). Land network 160 may be comprised of a wired network, an optical network, a fiber network, another wireless network, or any combination thereof. Land network 160 may be connected to one or more landline telephones 162. Land network 160 may connect communication network 150 to call center 170. Communication network 150 and land network 160 may connect wireless carrier system 140 to a communication node or call center 170.

Call center 170 may contain one or more private branch exchange (PBX) and computer telephony integration (CTI) devices 172 with one or more phone lines, one or more voices data switches 174, one or more network bus systems 176, one or more communication services managers 180, one or more communication services databases 182, and one or more communication services advisors 184. Communication services advisor 184 may be a human advisor, or virtual advisor.

Call center 170 way be a location where many calls may be received and serviced at the same time, or where many calls may be sent at the same time. The call center may be referred to as a telematics call center, facilitating communications to and from telematics unit 120 in mobile vehicle 110. The call center may be a voice call center, providing verbal communications between an advisor in the call center and a subscriber in a mobile vehicle. The call center may contain each of these functions.

One or more PBX and CTI devices 172 and one or more switches 174 may connect call center 170 to land network 160. A phone line trunk with multiple phone lines may connect call center 170 to land network 160. PBX and CTI device 172 may send voice communications to and receive voice communications over one or more phone lines. PBX and CTI device 172 may have access to multiple service function dedicated phone numbers. The service function dedicated phone numbers may be connected to mobile vehicle 110 via land network 160, communication network 150 and wireless carrier system 140.

PBX and CTI device 172 may transmit voice or data transmissions between call center 170 and land network 160. Likewise, switch 174 may transmit voice or data transmissions between call center 170 and land network 160. PBX and CTI device 172 and switch 174 may be one integrated piece of equipment. PBX and CTI device 172 and switch 174 also may receive voice or data transmissions from telematics unit 120 in mobile vehicle 110 through wireless carrier system 140, communication network 150, and land network 160.

PBX and CTI device 172 and switch 174 may receive data transmissions from or send data transmissions to one or more communication services managers 180 via one or more bus systems 176. Communication services manager 180 may be any suitable hardware and software capable of providing requested communication services to telematics unit 120 in mobile vehicle 110. Communication services manager 180 may send to or receive from one or more communication services databases 182 data transmissions via bus system 176. Communication services manager 180 may send to or receive from one or more communication services advisors 184 data transmissions via bus system 176. Communication services database 182 may send to or receive from communication services advisor 184 data transmissions via bus system 176. Communication services advisor 184 may receive from or send to PBX and CTI device 172 voice or data transmissions. Communication services advisor 184 may receive from or send to switch 174 voice or data transmissions.

Communication services manager 180 may provide one or more of a variety of services, including enrollment services, navigation assistance, directory assistance, roadside assistance, business or residential assistance, information services assistance, emergency assistance, and communications assistance. Communication services manager 180 may transmit data to telematics unit 120 in mobile vehicle 110 through wireless carrier system 140, communication network 150, land network 160, switch 174, PBX and CTI device 172, and bus system 176. Communication services manager 180 may store or retrieve data and information from communication services database 182. Communication services manager 180 may provide requested information to communication services advisor 184.

Communication services advisor 184 may be a real advisor or a virtual advisor. A real advisor may be a human being in verbal communication with a user or subscriber in mobile vehicle 110 via telematics unit 120. A virtual advisor may be a synthesized voice interface responding to requests from telematics unit 120 in mobile vehicle 110.

Communication services advisor 184 may provide services to telematics unit 120 in mobile vehicle 110. Services provided by communication services advisor 184 may include enrollment services, navigation assistance, directory assistance, roadside assistance, business or residential assistance, information services assistance, emergency assistance, and communications assistance. Communication services advisor 184 may communicate with telematics unit 120 in mobile vehicle 110 through wireless carrier system 140, communication network 150, and land network 160 using voice transmissions, or through communication services manager 180 and switch 174 using data transmissions. Switch 174 may select between voice transmissions and data transmissions.

Telematics unit 120 in mobile vehicle 110 may initiate a service request to call center 170 via wireless modem 124, wireless carrier system 140, communication network 150, and land network 160. In one embodiment of the present invention, a telematics subscriber may originate the request service for a mobile vehicle from landline telephone 162 or a cell phone outside of mobile vehicle 110. The service initiation call may be originated from call center 170.

Figure 2:
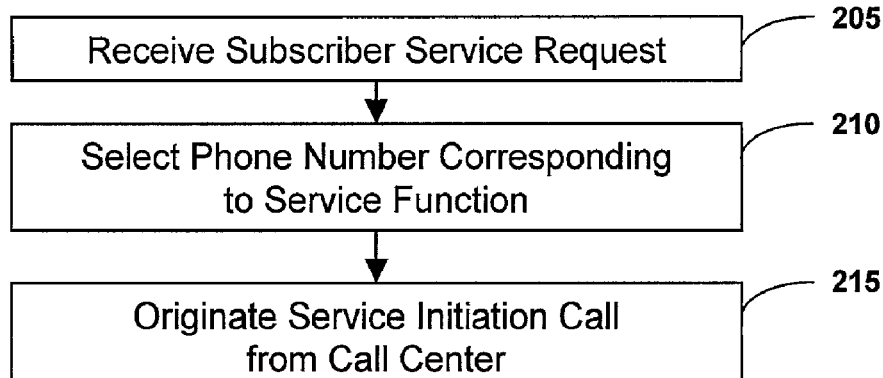
FIG. 2 is a flow diagram of one embodiment of a method for initiating a telematics service to a mobile vehicle, in accordance with the current invention.
Figure 2:
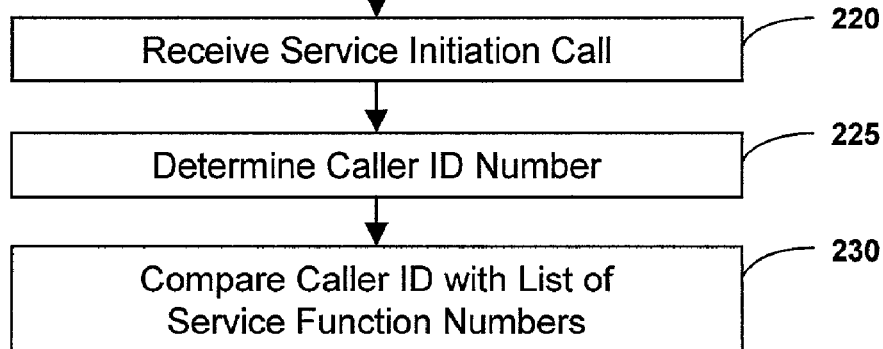
Figure 2:
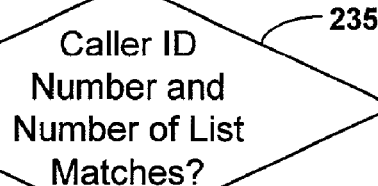
Figure 2:
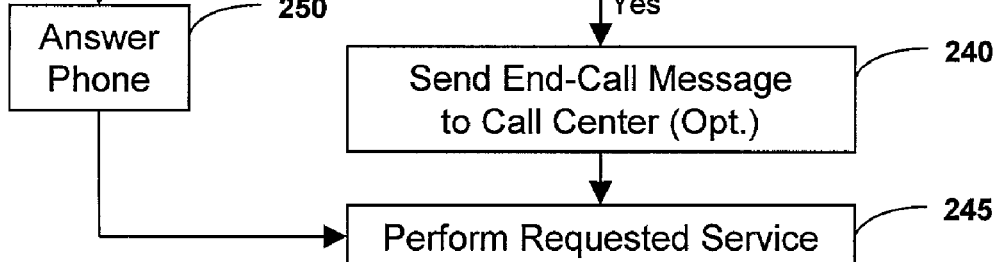

FIG. 2 shows a flow diagram of one embodiment of a method for initiating a service to a mobile vehicle using caller identification technology, in accordance with the current invention. Telematics service initiation method 200 comprises steps to initiate a telematics service request at a mobile vehicle. The telematics unit may receive a service initiation call from the call center and determine a caller identification number of the service initiation call. The telematics unit may direct a vehicle service function to be performed based on the caller identification number. A group of specific directory phone numbers at the call center may be logically mapped to specific telematics services for a mobile vehicle, so that the ringing of a phone call from a call center to an in-vehicle telematics unit may trigger a service function. A telematics subscriber may request the service.

A telematics service subscriber or user may call a call center from a mobile phone or landline phone to request a service function or event. The user may want, for example, to unlock a door of a vehicle with keys locked inside or to invoke or initiate an electronic diagnostic function in the vehicle.

The user may have set up an account previously with the call center. A service initiation call may originate from the call center in response to a subscriber request for service. A subscriber service request may be received, for example, via communication with a human advisor, a dual-tone multiple frequency (DTMF) protocol, or an interactive voice response application at the call center, as seen at block 205. The call center may verify the request and authenticate the subscriber with the input of a user account number, a personal identification number (PIN), or other predetermined authentication procedure. The call center may check its records in a database and compare them with the information given by the subscriber for verification.

The call center may select the phone number that is dedicated to calling out to mobile vehicles, as seen in block 210. The service initiation call may be made from a service function dedicated phone number associated with the service function. The service initiation call may be selected to originate from one of a plurality of phone numbers corresponding to service functions.

The call center may initiate service by calling out on a phone line that is dedicated to sending out requests for one specific type of service, as seen at block 215. The service initiation call may originate from the call center in response to a subscriber request for the service. The service initiation call may be made using an analog wireless network, a digital wireless network, a landline network, a telecommunications network, or any combination thereof.

A virtual or human advisor may initiate a service delivery that sends an event request to the computer telephony integration system from the vehicle communications system at the call center. The computer telephony integration system may initiate a telecommunications call origination event or a service initiation call. The PBX phone system may begin the process of setting up a call with a mobile vehicle. For example, the call center may choose the phone line with the phone number 555-888-1111 to call out to mobile vehicles for which doors need to be unlocked. The phone number 555-888-1112 may be used, for example, to call out to mobile vehicles for locking the doors. The call may be routed through a land network, communication network and a wireless carrier network, the latter serving as the wireless network provider of the telematics unit. The wireless provider may initiate a connection with the mobile phone of the telematics unit by sending a page request over a control channel of an air interface.

The mobile phone of the telematics unit in the mobile vehicle may receive a service initiation call from the call center, as seen at block 220. The embedded in-vehicle cellular phone may receive a page, and send a call notification event to the vehicle communications processor or system controller. Attached to the call notification may be the calling party's directory number. A computer application in the telematics unit may determine the caller identification number of the service initiation call, as seen at block 225. The calling party's telephone number may be extracted from the call notification event.

The system controller may compare the caller identification with numbers in a list or table of phone numbers associated with specific functions and services that may be provided at the mobile vehicle, as seen at block 230. The system controller software may look in the table to see if the directory number of the calling party matches any of its logically mapped event numbers. A previously loaded or downloaded list may be stored in the in-vehicle memory of the telematics unit. The vehicle service function determination may compare the caller identification number to a list of numbers corresponding to service functions. The services include but are not limited to a door lock function, a door unlock function, an alarm enable function, an alarm disable function, a lights flash function, an ignition disable function, a call initiate function, an enable function, a disable function, an on function, an off function, a diagnostic invocation function, a telematics function, or a system activation function. The call initiation function may be mapped to a service that prompts the system controller to initiate a call to a prescribed number such as the call center number. An enable function may include any function that powers up or allows a device to operate. A disable function may include any function that powers down or prevents a device from operating. A diagnostic invocation function may include the initiation of a check or inquiry into the condition of a part in the vehicle or telematics unit, and may include uploading diagnostic data to the call center. A telematics function may be any function related to the telematics unit including communication functions associated with the embedded phone. A system activation function may include the initiation of a vehicle or telematics unit function such as a check on the condition or status of a device or an electronic module in the vehicle. The vehicle service function may be determined based on the caller identification number.

The caller identification may or may not match one of the phone numbers that are associated with specific in-vehicle service functions, as seen at block 235.

When the caller identification number matches one of the phone numbers on the list, the telematics unit of the vehicle may determine not to answer the incoming call. The telematics unit may send an end-call message in response to the service initiation call sent by the call center, as seen at block 240. The system controller may instruct the in-vehicle phone to end the mobile-terminated call attempt. Sending an end-call message to the in-vehicle phone may terminate the call.

Alternatively, the telematics unit may not answer the incoming call and may not send an end-call message. In either case, an actual voice circuit may never be established between the mobile vehicle and the call center when utilizing Signaling System 7 (SS7) and signal connection control part (SCCP), current standards that allow a calling party number message (CPNM or CPN) and related call setup messaging to be sent. Use of call resources and actual telecommunication airtime charges may be reduced.

Whether or not the telematics unit sends back an end-call message, the telematics unit may proceed to perform the service or action associated with the directory number received in the call notification based on the vehicle service function determination. The system controller in the telematics unit may signal the appropriate vehicle hardware to perform the function, service or action that has been associated with the phone or directory number received in the call notification of the incoming call, as seen at block 245. The signals may trigger specific functions or events that are logically mapped to each of their dedicated phone directory numbers at the call center, such as functions with binary results of on/off, enable/disable, or true/false. This method of performing simple remote operations tasks between a mobile or portable device and a designated call center may replace or present a viable alternative to a more complex protocol environment in communications between a mobile vehicle and call center.

When the phone number of the incoming call does not match one of the phone numbers in the list of phone numbers with associated service functions, the telematics unit may direct the in-vehicle phone to answer the phone call, as seen at block 250. At this time, the call center may send command signals or other digital data needed to perform the service function that was requested, as seen back at block 245.

The embodiments described above have been related to telematics units in mobile vehicles, although this invention encompasses a method and system for initiating an event within other types of portable or mobile units. While the embodiments of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

The invention claimed is:

1. A method of initiating a telematics service to a mobile vehicle comprising:
   receiving a service initiation call from a call center;
   determining a caller identification number of the service initiation call; and
   determining a vehicle service function based on the caller identification number.

2. The method of claim 1 wherein the service initiation call is made from a phone having a service function dedicated phone number.

3. The method of claim 1 wherein the vehicle service function determination comprises comparing the caller identification number to a list of numbers corresponding to service functions.

4. The method of claim 1 wherein the vehicle service function is selected from the group consisting of a door lock function, a door unlock function, an alarm enable function, an alarm disable function, a lights flash function, an ignition disable function, a call initiate function, an enable function, a disable function, an on function, an off function, a diagnostic invocation function, a telematics function, and a system activation function.

5. The method of claim 1 wherein the service initiation call is made using one of an analog wireless network or a digital wireless network.

6. The method of claim 1 further comprising:
   sending an end-call message from the vehicle in response to the service initiation call.

7. The method of claim 1 further comprising:
   performing a service based on the vehicle service function determination.

8. The method of claim 1 wherein the service initiation call originates from the call center in response to a subscriber request for the service.

9. The method of claim 8 wherein the service initiation call is selected to originate from one of a plurality of phone numbers corresponding to service functions.

10. The method of claim 1 wherein the mobile vehicle determines whether to answer the service initiation call based on the determined caller identification number.

11. A computer readable medium including a program for initiating a telematics service to a mobile vehicle comprising:
    computer program code to receive a service initiation call from a call center;
    computer program code to determine a caller identification number of the service initiation call; and
    computer program code to determine a vehicle service function based on the caller identification number.

12. The computer readable medium of claim 11 wherein the service initiation call is made from a phone having a service function dedicated phone number.

13. The computer readable medium of claim 11 wherein the vehicle service function determination comprises comparing the caller identification number to a list of numbers corresponding to service functions.

14. The computer readable medium of claim 11 wherein the vehicle service function is selected from the group consisting of a door lock function, a door unlock function, an alarm enable function, an alarm disable function, a lights flash function, an ignition disable function, a call initiate function, an enable function, a disable function, an on function, an off function, a diagnostic invocation function, a telematics function, and a system activation function.

15. The computer readable medium of claim 11 wherein the service initiation call is made using one of an analog wireless network or a digital wireless network.

16. The computer readable medium of claim 11 further comprising:

computer program code to send an end-call message from the vehicle in response to the service initiation call.

17. The computer readable medium of claim 11 further comprising:

computer program code to perform a service based on the vehicle service function determination.

18. The computer readable medium of claim 11 wherein the service initiation call is selected to originate from one of a plurality of phone numbers corresponding to service functions.

19. A system for initiating a telematics service to a mobile vehicle comprising:

means for receiving a service initiation call from a call center;

means for determining a caller identification number of the service initiation call; and means for determining a vehicle service function based on the caller identification number.

20. The system of claim 19 further comprising:

means for sending an end-call message from the vehicle in response to the service initiation call.

21. The system of claim 19 further comprising:

means for performing a service based on the vehicle service function determination.

\* \* \* \* \*